T. SABELBERG.
TOASTER.
APPLICATION FILED NOV. 24, 1916.
1,213,025.
Patented Jan. 16, 1917.
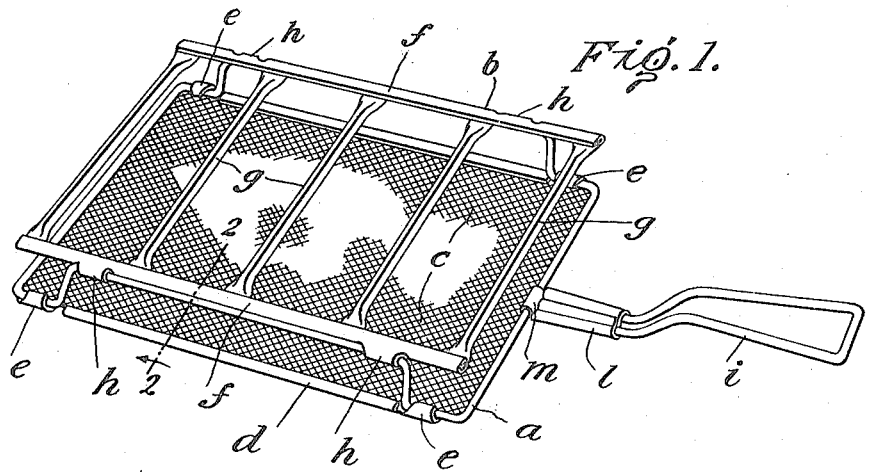
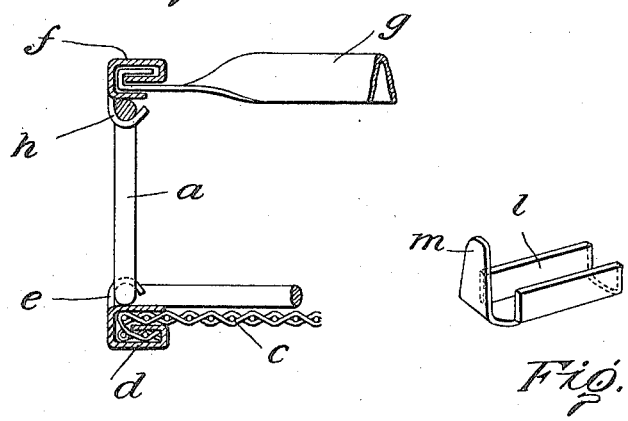
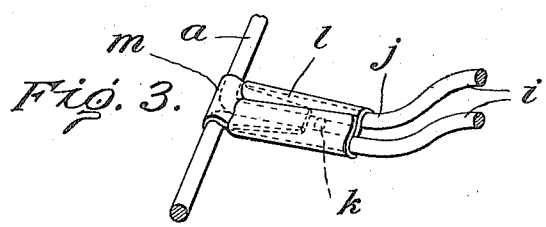
Inventor
Thomas Sabelberg
By B. Singer,
Attorney

UNITED STATES PATENT OFFICE.

THOMAS SABELBERG, OF PORT MELBOURNE, VICTORIA, AUSTRALIA.

TOASTER.

1,213,025.   Specification of Letters Patent.   Patented Jan. 16, 1917.

Application filed November 24, 1916.   Serial No. 133,247.

*To all whom it may concern:*

Be it known that I, THOMAS SABELBERG, of No. 422 Graham street, Port Melbourne, in the State of Victoria, Commonwealth of Australia, have invented certain new and useful Improvements in Toasters, of which the following is a specification.

This invention relates to an improved utensil for domestic uses and it has been devised particularly for the purpose of providing a simple, light and convenient contrivance that can be used effectively with any ordinary type of gas or oil burner or fire for toasting bread and the like or for boiling milk without permitting the flame of the burner coming into contact with the vessel containing the same.

The invention comprises briefly a grid for supporting the bread to be toasted or the vessel to be heated and a sheet of wire mesh for dispersing the flame of a burner without obstructing the passage of the heat to the bread or vessel. The grid is located at a suitable distance above the sheet of wire mesh and they are both carried on a wire frame provided with a handle for convenience of use.

In order that the invention may be readily understood reference will now be had to the accompanying sheet of explanatory drawings, wherein—

Figure 1 is a view in perspective of a utensil constructed in accordance with the invention. Fig. 2 is a view in sectional elevation of part of the utensil taken on the plane 2—2 of Fig. 1. Fig. 3 is a view in perspective of portion of the wire frame of the improved utensil. Fig. 4 is a view in perspective of a clip employed to fasten the ends of the wire frame.

In these drawings like characters of reference have been employed to indicate similar parts in the different views and the letter $a$ indicates a wire frame of rectangular formation that is designed to support a grid $b$ and sheet of close wire mesh $c$. The sides of the wire frame are bent upwardly to support the grid $b$ at a suitable height above the sheet of wire mesh $c$. The sides of the sheet of close wire mesh $c$ are folded in strips $d$ of thin sheet metal to provide rigidity of construction and means for securing the said mesh to the frame.

The manner of securing the reinforcing strips $d$ to the sheet of close wire mesh is clearly shown in Fig. 2 of the drawings.

The reinforcing strips $d$ are formed with tongues $e$ that are bent around the side wires of the frame $a$—at the ends of the upwardly bent portions—to securely attach the sheet of wire mesh to the said frame. The grid $b$ is formed of two side members $f$ of folded strips of thin sheet metal and a plurality of cross members $g$ having their ends folded in the said side members.

The construction of the side and cross members is shown clearly in Figs. 1 and 2 of the drawings.

The portions of the cross members $g$ between the side members are given semi-tubulous shapes to insure rigidity of construction. The side members $f$ are formed with tongues $h$ that are folded around the upwardly bent portions of the sides of the frame to securely attach the grid thereto. The ends of the wire forming the rectangular frame $a$ are bent outwardly at right angles from one end thereof to form an integral handle $i$ (see Figs. 1 and 3 of the drawings). One end $j$ of the wire from which the frame is made is left longer than the other end $k$ and the longer end is looped to form the handle and then returned to lie adjacent to and parallel with the shorter end $k$ of the wire. A clip $l$ is employed to securely fasten the free ends of the wire frame $a$ and said clip is formed with a retaining piece or tongue $m$. The clip $l$ is formed from a rectangular shaped piece of thin sheet metal the sides and tongue portion of which are bent upwardly as shown in Fig. 4 of the drawings. The clip $l$ is placed on the free ends of the wire frame as shown in Fig. 3 and the tongue $m$ is bent inwardly between the side portions thereof. The tongue $m$ is pressed down tightly on the wire and then the sides of the clip are folded over the top of the tongue thereby securely holding the free ends of the wire and making the frame rigid.

In use the utensil is placed over the flame of a burner with the wire mesh downward and the bread or other article to be toasted or heated is placed on the grid.

The wire mesh must be sufficiently close to prevent the flame of the burner passing therethrough and coming into contact with the food or vessel on the grid and sufficiently open to permit of the free passage of heat.

The utensil is neat in appearance, can be economically manufactured and in use will be found highly efficient for toasting bread or the like very rapidly with a minimum of heat.

What I do claim is:—

1. A toasting utensil comprising in combination a grid, a sheet of wire mesh spaced from said grid and parallel thereto, an integral frame including a handle and comprising a single wire shaped to form said handle and extending around the grid and sheet members, at the outer edges thereof and a portion of the wire lying substantially in the plane of said grid and another portion of the wire lying substantially in the plane of said sheet, said wire being bent transversely to the planes of said sheet and said grid, said grid having cross-members and sheet-metal side members into which the ends of the cross-members are folded, said side members having tongues clasping said wire, and sheet metal strips into which the edges of said sheet are folded, said strips also having tongues clasping said wire.

2. A toasting utensil comprising in combination a grid, a sheet of wire mesh spaced from said grid and parallel thereto, an integral frame including a handle and comprising a single wire shaped to form a handle and extending around the grid and sheet members, at the outer edges thereof and a portion of the wire lying substantially in the plane of said grid and another portion of the wire lying substantially in the plane of said sheet, said wire being bent transversely to the planes of said sheet and said grid, said grid having cross-members and sheet-metal side members into which the ends of the cross-members are folded, said side members having tongues clasping said wire, and sheet metal strips into which the edges of said sheet are folded, said strips also having tongues clasping said wire and a sheet clip clasping the two portions of said wire forming the handle at the base of the handle.

3. A toasting utensil comprising in combination a grid, a sheet of wire mesh spaced from said grid and parallel thereto, an integral frame including a handle and comprising a single wire shaped to form a handle and extending around the grid and sheet members, at the outer edges thereof and a portion of the wire lying substantially in the plane of said grid and another portion of the wire lying substantially in the plane of said sheet, said wire being bent transversely to the planes of said sheet and said grid, said grid having cross-members and sheet-metal side members into which the ends of the cross-members are folded, said side members having tongues clasping said wire, and sheet metal strips into which the edges of said sheet are folded, said strips also having tongues clasping said wire and a sheet clip clasping the two portions of said wire forming the handle at the base of the handle, said clip also covering the opening at the junction of the handle with the main body of the handle.

In testimony whereof I affix my signature in presence of two witnesses.

THOMAS SABELBERG.

Witnesses:
A. J. CALLINAN,
WALTER T. W. CHILD.